US010310533B2

(12) United States Patent
Cha (10) Patent No.: US 10,310,533 B2
(45) Date of Patent: Jun. 4, 2019

(54) ELECTRIC POWER SYSTEM (71) Applicant: LSIS CO., LTD., Gyeonggi-do (KR)

(72) Inventor: Jae-Hong Cha, Gyeonggi-do (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 306 days.

(21) Appl. No.: 15/350,313

(22) Filed: Nov. 14, 2016

(65) Prior Publication Data

US 2017/0248982 A1    Aug. 31, 2017

(30) Foreign Application Priority Data

Feb. 26, 2016    (KR) .................. 10-2016-0023695

(51) Int. Cl.
*G05F 1/66* (2006.01)
*H04L 29/08* (2006.01)
*H04L 29/06* (2006.01)

(52) U.S. Cl.
CPC .............. *G05F 1/66* (2013.01); *H04L 67/12* (2013.01); *H04L 67/42* (2013.01)

(58) Field of Classification Search
CPC ........................................................ G05F 1/66
See application file for complete search history.

(56) References Cited

U.S. PATENT DOCUMENTS 8,924,961 B2    12/2014    Radhakrishnan et al.
9,135,454 B2    9/2015    Shikfa et al.

FOREIGN PATENT DOCUMENTS

JP    H8-249261 A    9/1996
KR    10-1375133 A    3/2014

OTHER PUBLICATIONS

WirelessHART IEC 62591:2016, IEC, 3, Rue De Varembe, PO Box 131, CH-1211 Geneva 20, Switzerland, Jan. 30, 2016 (Jan. 30, 2016), pp. 1-1043, XP082002766 (Year: 2016).*
European Search Reports dated Mar. 27, 2017 in connection with the counterpart European Patent Application No. 16193035.9.
"Industrial networks—Wireless communication network and communication profiles—WirelessHART", ICE 62591:2016, ICE, 3, Rue De Varembe, PO Box 131, CH-1211 Geneva 20, Switzerland, 2016, pp. 1-1043.

* cited by examiner

*Primary Examiner* — Yu-Hsi D Sun
(74) *Attorney, Agent, or Firm* — K&L Gates LLP (57) ABSTRACT

Disclosed herein is an electric power control system including a communication apparatus, a server, and a client, wherein the communication apparatus includes a communication unit operative to communicate with the client and server included in the electric power system to relay the service request received from the client to the server and relay the response to the service request received from the server to the client, a comparison/determination unit operative to compare a timeout time taken for the client to wait for the response to the service request with a processing time taken for the server to process the service request, and a controller operative to control the communication unit and the comparison/determination unit and to announce to the client that the processing time is longer than the timeout time when the processing time is longer than the timeout time.

3 Claims, 8 Drawing Sheets

FIG. 1

(PRIOR ART)

ELECTRIC POWER SYSTEM

CROSS REFERENCE TO RELATED APPLICATION

This application claims the benefit of Korean Patent Application No. 10-2016-0023695, filed on Feb. 26, 2016, entitled "ELECTRIC POWER SYSTEM", which hereby incorporated by reference in its entirety into this application.

BACKGROUND

1. Technical Field

The present invention relates to a communication apparatus in an electric power system and a communication method for the same and, more particularly, a communication apparatus in an electric power system which is capable of announcing, to a client, a reason for no response from a server as a data processing time is longer than a timeout time of the client and proposing a solution to handle the situation and a communication method for the same.

2. Description of the Related Art

An electric power system includes a supervisory control and data acquisition (SCADA), an energy management system (EMS), and a distribution management system (DMS). These systems store values acquired from a device in a real time database (RTDB) of a server. A client performs alarm processing, data processing, control processing and history processing, using the values stored in the RTDB of the server.

In the communication architecture of an application constituting the electric power system, the request-response communication is implemented by a 3 Tier architecture of Requester-Broker-Replier.

Figure 1:
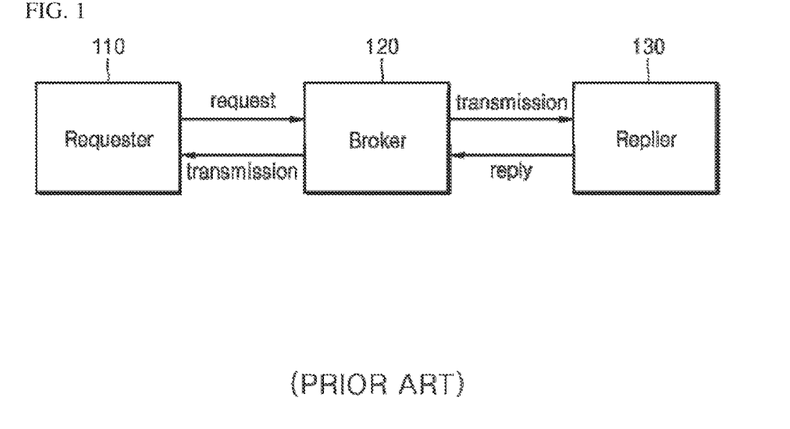
FIG. 1 illustrates configuration of client-server communication in a typical 3 Tier architecture.

FIG. 1 illustrates configuration of client-server communication in a typical 3 Tier architecture.

Client-server communication of the 3 Tier architecture may include a requester 110, a broker 120 and a replier 130.

The requester 110, which is usually implemented in the client, requests a service and is provided with the service from the replier 130.

The replier 130, which is usually implemented in the server, processes the request for e service from the requester 110 and sends a response to the requester 110.

The broker 120 serves to relay messages between the requester 110 and the replier 130.

In transmitting a message, the requester 110 may set a timeout for the message. The timeout is a waiting time for which a response is awaited. That is, the timeout represents duration from the time at which a request is made by the requester 110 to the time at which a response is made by the replier 130.

If there is no response within the timeout time, the requester 110 performs a next operation without waiting for the response anymore. That is, when asynchronous communication is performed, the requester 110 transmits a service request again, considering that the previous service request has failed.

If the data processing time of the replier 130 is longer than the timeout time set by the requester 110, and thus a response cannot be sent, there is no way for the requester 110 to recognize this situation. Thereby, the requester 110 cannot recognize the cause of failure of the request.

SUMMARY

It is an aspect of the present invention to provide a communication apparatus in an electric power system which has a 3 Tier communication architecture including a requester, a broker and a replier and is capable of announcing, through a message or a log file, a reason for the replier to fail to send a response to the requester as a data processing time of the replier is longer than a timeout time of the requester, by providing a separate observation function to the broker and proposing a solution to handle the situation and a communication method for the same.

Objects of the proposed embodiments are not limited to the aforementioned objects, and other objects which are not mentioned above will become apparent to those having ordinary skill in the art upon examination of the following description.

In accordance with one aspect of the present invention, a communication apparatus in an electric power system includes a communication unit operative to communicate with a client and server included in the electric power system to relay a service request received from the client to the server and relay a response to the service request received from the server to the client, a comparison/determination unit operative to compare a timeout time taken for the client to wait for the response to the service request with a processing time taken for the server to process the service request, and a controller operative to control the communication unit and the comparison/determination unit and to announce to the client that the processing time is longer than the timeout time when the processing time is longer than the timeout time.

In accordance with another aspect of the present invention, an electric power control system includes a client operative to transmit a service request to a communication apparatus and receive a response to the service request processed by the server via the communication apparatus; and a communication apparatus operative to relay the service request received from the client to the server, relay the response to the service request received from the server to the client, compare a timeout time taken for the client to wait for the response to the service request with a processing time taken for the server to process the service request, and announce to the client that the processing time is longer than the timeout time when the processing time is longer than the timeout time, and a server operative to process the service request received from the communication apparatus and transmit the response to the service request to the communication apparatus.

In accordance with another aspect of the present invention, a method for performing communication by a communication apparatus in an electric power system includes receiving a service request from a client and relaying the same to a server; receiving, from the server, a response to the service request; comparing a timeout time taken for the client to wait for the response to the service request with a processing time taken for the server to process the service request; and announcing to the client that the processing time is longer than the timeout time in relaying the response to the client when the processing time is longer than the timeout time.

According to embodiments of the present invention, when a data processing time of a replier is longer than a timeout time set by a requester in the 3 Tier architecture of Requester-Broker-Replier, the broker compares the times and announces, to the user, a reason for failing to send a response to the request to the requester, using a log file or message. Thereby, the time taken to analyze the cause may be reduced.

DETAILED DESCRIPTION

Hereinafter, embodiments of the present invention will be described in detail with reference to the accompanying drawings. It should be understood that the present invention is not limited to the following embodiments, and that the embodiments are provided for illustrative purposes only. It will be appreciated by those skilled in the art that various substitutions, modifications and variations can be made in the present invention without departing from the scope of the present invention.

Although the terms used in this specification are selected, as much as possible, from general terms that are widely used at present, terms that are arbitrarily selected by the applicant may be used in a particular case. In this case, meanings of these terms are disclosed in corresponding description parts of the invention. Accordingly, it should be noted that the present invention should be understood based on practical meanings of the terms rather than on the names of the terms. In the following description, the term "include" should not be understood as pre-excluding possibility of existence of constituents or steps other than the constituents or steps disclosed herein.

Figure 2:
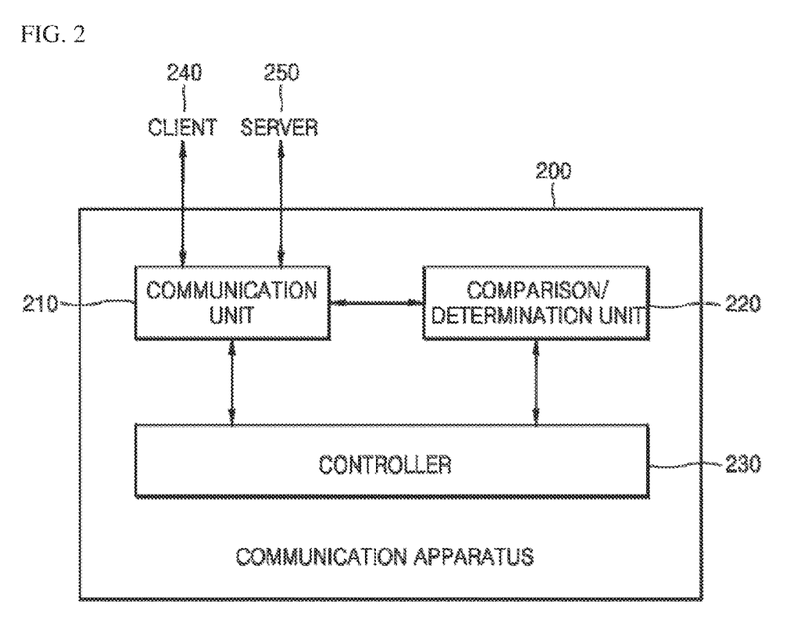
FIG. 2 is a block diagram illustrating configuration of a communication apparatus according to an embodiment of the present invention.

FIG. 2 is a block diagram illustrating configuration of a communication apparatus according to an embodiment of the present invention.

According to an embodiment of the present invention, a communication apparatus 200 may be included in an electric power system 400. The electric power system 400 will be described in detail with reference to FIG. 6 later.

The communication apparatus 200 may include a communication unit 210, a comparison/determination unit 220 and a controller 230.

The communication unit 210 may communicate with a client 240 and a server 250, which are included in the electric power system 400.

Schemes used by the communication unit 210 to communicate with the client 240 and the server 250 may include various wired/wireless communication schemes. Specifically, the communication unit 210 may perform wired communication with the client 240 and server 250 via a cable, wire or power line which connects the communication unit 210 to the client 240 and server 250, or perform wireless communication including short-range communication, wireless LAN communication, mobile communication and data communication.

In this case, the communication unit 210, the client 240 and server 250 may configure client-server communication of the 3 Tier architecture. Client-server communication of the 3 Tier architecture will be described with reference to FIG. 6 later.

The communication unit 210 may relay a service request received from the client 240 to the server 250, and relay, to the client 240, a response received from the server 250 in response to the service request.

The service request may contain a frame field for a timeout time. The timeout time may be a time for which the client 240 waits for a response to the service request. The response to the service request may contain a frame field for a processing time. The processing time may be a time to process the service request. The frame field for the timeout time will be described in detail with reference to FIG. 3, and the frame field for the processing time will be described in detail with reference to FIG. 4 later.

The comparison/determination unit 220 may compare the timeout time for which the client 240 waits for a response to the service request with the processing time for which the server 250 processes the service request.

Specifically, the comparison/determination unit 220 may compare the timeout time with the processing time to determine whether the processing time is longer than the timeout time. To this end, the comparison/determination unit 220 may include a calculation block for performing the operation of addition (+) and/or subtraction (−).

If the processing time is longer than the timeout time, the comparison/determination unit 220 may determine a delay time between the timeout time and the time at which a response to the service request is made.

As described above, the controller 230 may control the communication unit 210 and the comparison/determination unit 220 to operate.

If the processing time is longer than the timeout time, the controller 230 may announce to the client 240 that the processing time is longer than the timeout time.

According to an embodiment, the controller 230 may control the communication unit 210 to transmit, to the client 240, a message containing a frame field indicating that the processing time is longer than the timeout time. The message containing the frame field indicating that the processing time is longer than the timeout time will be described with reference to FIG. 5 later.

According to another embodiment, the controller 230 may generate a log file for recording the information indicating that the processing time is longer than the timeout time.

The log file is a record of operation of the system. The log file may include all records related to operation of the system including a system operation record, change of the system condition, switch selection, details about an input/output device, data input through a control console, and the condition of the system when the system is stopped or the cause of the stopping. When a corresponding event occurs, a log file for details of the event may be generated or the details may be automatically recorded in the log file present in the system.

Once the comparison/determination unit 220 determines the delay time from the timeout time to the time at which a response to the service request is made by comparing the timeout time with the processing time, the controller 230 may control the communication unit 210 to transmit, to the client 240, a message indicating that the timeout time should be adjusted based on the delay time.

Figure 3:
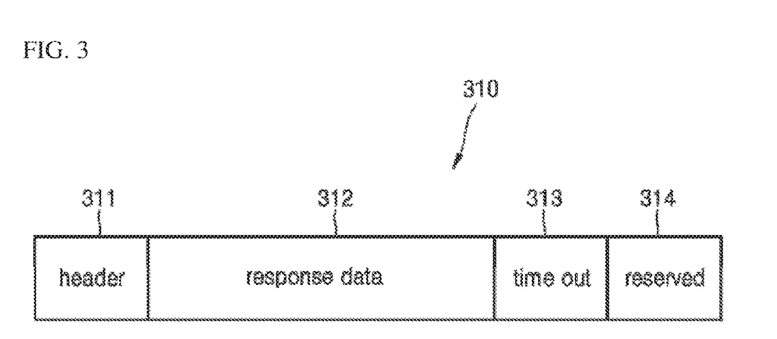
FIGS. 3 to 5 illustrate frame configuration of messages that a communication apparatus transmits/receives to/from a client and server according to an embodiment of the present invention.
Figure 4:
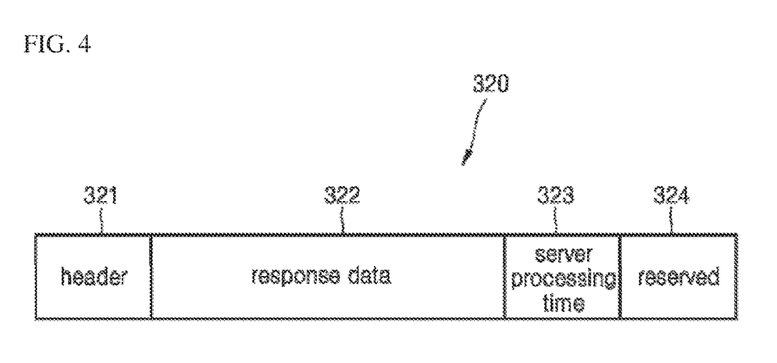
Figure 5:
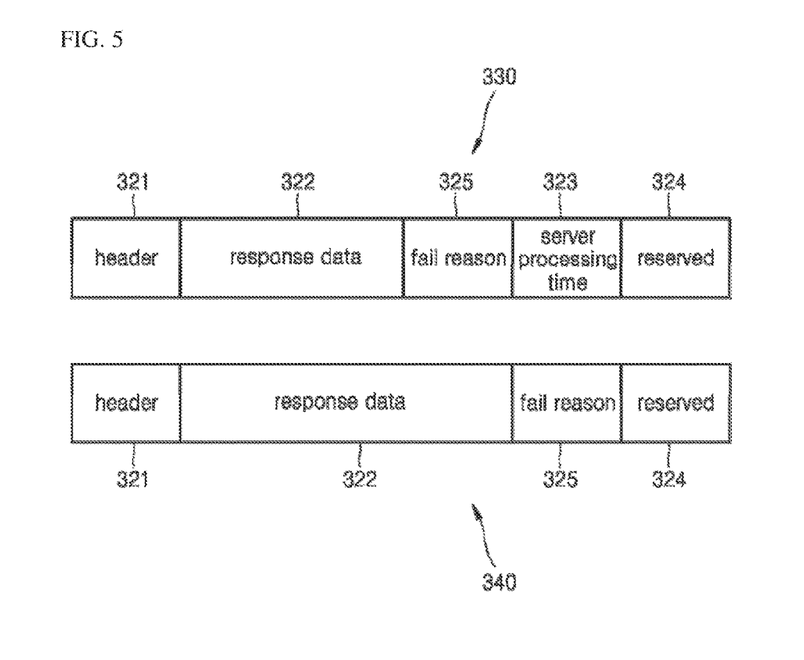

FIGS. 3 to 5 illustrate frame configuration of messages that a communication apparatus transmits/receives to/from a client and server according to an embodiment of the present invention.

FIG. 3 shows a service request message 310 transmitted from the client 240. Specifically, the service request message 310 may include a header field 311, a request data field 312, a timeout field 313, and a reserved field 314.

The header field 311 may include information necessary for routing and delivery of the service request message 310.

The request data field 312 includes information about a service request which the client 240 sends to the server 250.

The timeout field 313 includes information about a time for which the client 240 waits for a response to the service request.

The Reserved field 314 is a field reserved in preparation for an unexpected event.

Referring to FIG. 3, the service request message 310 which the client 240 transmits to the communication apparatus 200 contains the timeout field 313. Thereby, the communication apparatus 200 and the server 250 may recognize the timeout time of the client 240 from the service request message 310.

FIG. 4 shows a response message 320 for the service request transmitted from the server 250. Specifically, the response message 320 may include a header field 321, a response data field 322, a server processing time field 323 and a reserved field 324.

The header field 321 includes information necessary for routing and delivery of the response message 320 corresponding to the service request.

The response data field 322 includes information about a response to the service request of the client 240 processed by the server 250.

The server processing time field 323 includes information about time taken for the server 250 to process the service request of the client 240.

The reserved field 324 is a field reserved in preparation for an unexpected event.

Referring to FIG. 4, the response message 320 for the service request transmitted from the server 250 to the communication apparatus 200 contains the server processing time field 323. Thereby, the communication apparatus 200 and the client 240 receiving the response message 320 for the service request may recognize the processing time of the server 250 through the message.

FIG. 5 shows response messages 330 and 340 for a service request transmitted from the communication apparatus 200 to the client 240. When the communication apparatus 200 determines that the processing time of the service request in the server 250 is longer than the timeout time of the client 240, the communication apparatus 200 may announce to the client 240 that the processing time is longer than the timeout time. Specifically, as shown in FIG. 4, upon receiving the response message 320 for the service request from the server 250, the communication apparatus 200 may add a fail reason frame 325 indicating a reason for failure of a service response to the response message 320.

In this case, the response messages 330 and 340 transmitted to the client 240 in response to the service request may include a header field 321, a response data field 322, a fail reason frame field 325 and a reserved field 324. In some embodiments, the server processing time field 323 may or may not be included.

The fail reason frame field 325 may include a reason for failure of a service response. For example, if the processing time of the server 250 is longer than the timeout time of the client 240, the fail reason frame field 325 is set to 1. If the processing time of the server 250 is shorter than or equal to the timeout time of the client 240, the fail reason frame field 325 is set to 0.

The other frame fields 321, 322, 323 and 324 have already been described above with reference to FIG. 4, and thus the description thereof will not be given below.

Referring to FIG. 5, the response messages 330 and 340 transmitted from the communication apparatus 200 to the client 240 in response to the service request contain the fail reason frame field 325. Thereby, the client 240 receiving the response messages 330 and 340 for the service request may recognize the reason for failure of the service request. For example, the client 240 may recognize that a response to the service request has not been received for the reason that the processing time of the server 250 is longer than the timeout time of the client 240 rather than for the reason of a communication error, by analyzing the messages.

Figure 6:
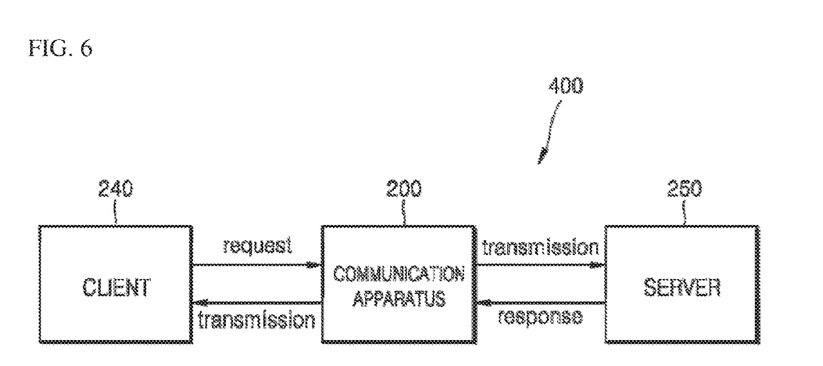
FIG. 6 illustrates configuration of client-server communication in a 3 Tier architecture in an electric power system according to an embodiment of the present invention.

FIG. 6 illustrates configuration of client-server communication in a 3 Tier architecture in an electric power system according to an embodiment of the present invention.

According to an embodiment, the electric power system 400 may include a client 240, a communication apparatus 200 and a server 250.

The client 240 transmits a service request to the communication apparatus 200, and receives a response to the service request processed by the server 250 via the communication apparatus 200.

The communication apparatus 200 may relay the service request received from the client 240 to the server 250, and relay, to the client 240, the response to the service request received from the server 250.

In this case, the communication apparatus 200 may compare a timeout time for which the client 240 waits for the response to the service request with a processing time for which the server 250 processes the service request. If the processing time is longer than the timeout time, the communication apparatus 200 may announce to the client 240 that the processing time is longer than the timeout time.

The server 250 may process the service request received from the communication apparatus 200, and transmit a response to the service request to the communication apparatus 200.

The electric power system 400 described above may perform client-server communication in the 3 Tier architecture.

The client-server communication model of the 3 Tier architecture is proposed to address an issue raised in the client-server communication model of the 2 Tier architecture, which maintains a one-to-one service relationship between the client and the server.

The 3 Tier architecture has a middle tier dedicated to application processing, and the client request all services to the middle tier. The middle tier communicates with a final server such as a database server, and then delivers a result of communication to the client.

Specifically, the client-server communication model of the 3 Tier architecture is configured as follows.

Tier 1 is a client responsible for a user interface. Tier 1 is also called a requester.

Tier 2 is an application processing server. Tier 2 corresponds to a broker.

Tier 3 is a server such as a database server that performs a final function. Tier 3 corresponds to a replier.

The 3 Tier architecture is advantageous in terms of service scalability, stability and efficiency, and is thus suitable for a high-capacity service. In addition, a request from the client is not directly delivered to the server in the 3 Tier architecture. Accordingly, load to the server does not increase in proportion to the number of clients.

In FIG. 6, the client 240 is a requester corresponding to Tier 1. The communication apparatus 200 is a broker corresponding to Tier 2, the server 250 is a replier corresponding to Tier 3.

According to this embodiment, an observation function is added to the broker 200. Thereafter, if the data processing time of the replier 250 is longer than the timeout time of the requester 240, the broker 200 announces to the requester 240 that the data processing time is longer than the timeout time.

If there is no response to a request from the requester 240 within the timeout time, this may be because there is a problem with a router or application, or the processing time is long in the replier 250. In the former case, the requester 240 needs to send the service request again. In the latter case, on the other hand, the response to the request has failed not because a problem has occurred but because the data processing time of the replier 250 is longer than the timeout time of the requester 240 registered in the broker 200. Accordingly, the broker 200 announces the reason to the user through a log file or message.

To this end, communication is performed between the requester 240, broker 200 and replier 250 according to a procedure described below.

When transmitting a message for a service request, the requester 240 delivers a timeout time to the broker 200 through the message.

The broker 200 is provided with a Thread having a separate observation function. Thereby, the broker 200 stores the timeout time of the requester 240 as stored in the requester 240, and then relays a received message to the replier 250.

The replier 250 measures the data processing tune from the moment at which the replier 250 receives the message, and sends a response message containing a frame field for the data processing time to the broker 200.

The replier 250 measures the data processing time from the moment at which the replier 250 receives the message. The timeout time of the requester 240 is counted from the time at which a data request is made, and thus the processing time is not synchronized with the start time of the timeout time. Accordingly, to allow the broker 200 to compare the data processing time with the timeout time, the replier 250 adds the duration from the time at which the requester 240 makes a request to the time at which the request is delivered to the replier 250 to the data processing time of the replier 250, and then transmit the data processing time to the broker 200.

The broker 200 compares the data processing time in the message received from the replier 250 with the registered timeout time of the requester 250 which is to be transmitted. If the timeout time is shorter than the data processing time, the broker 200 announces a reason for transmission failure to the user through a log file or message.

Failure of response to the service request may occur for various reasons. According to this embodiment, if a response is not issued for the waiting time of the requester 240 simply because the data processing time of the replier 250 is long, this information may be presented and a solution may be proposed.

Figure 7:
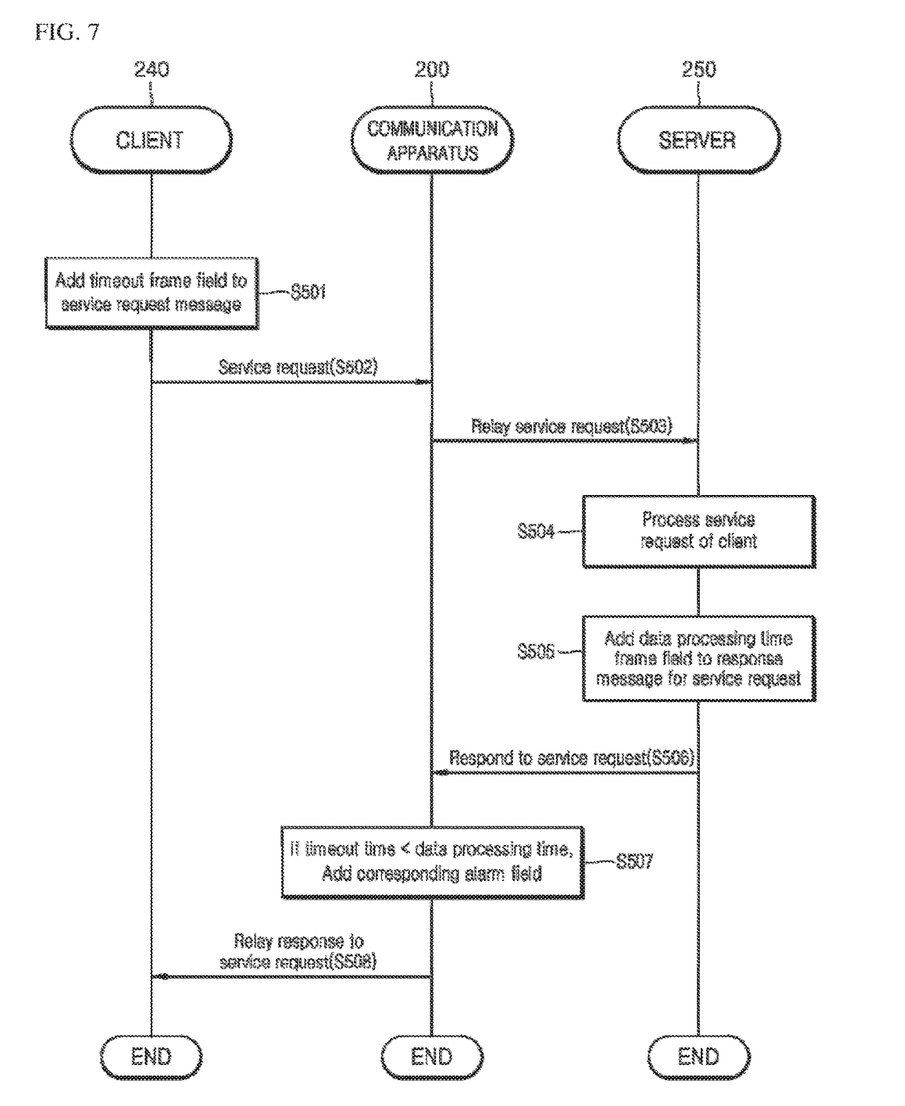
FIG. 7 illustrates a procedure of communication among a communication apparatus, a client and a server in an electric power system according to an embodiment of the present invention.

FIG. 7 illustrates a procedure of communication among a communication apparatus, a client and a server in an electric power system according to an embodiment of the present invention.

When the client 240 makes a service request, the client 240 adds a timeout frame field to a service request message (S501).

The client 240 transmits the service request message containing the timeout frame field to the communication apparatus 200 to make a service request to the communication apparatus 200 (S502).

Upon receiving the service request from the client and 240, the communication apparatus 200 relays the service request to the server 250 (S503).

The server 250 processes the service request of the client 240 (S504).

After processing the service request, the server 250 adds a data processing time frame field to a response message for the service request (S505). To this end, the server 250 measures the data processing time from the moment at which the server 250 receives the service request. Then, the server 250 adds a frame field for the data processing time to a response message for the request and sends the response message to the communication apparatus 200.

The server 250 transmits a response to the service request to the communication apparatus 200 (S506).

In this case, the communication apparatus 200 determines whether the timeout time is shorter than the data processing time. If the timeout time is shorter than the data processing time, the communication apparatus 200 adds an alarm field indicating this information to the response message for the service request (S507).

The communication apparatus 200 relays the response to the service request to the client 240 (S508).

Figure 8:
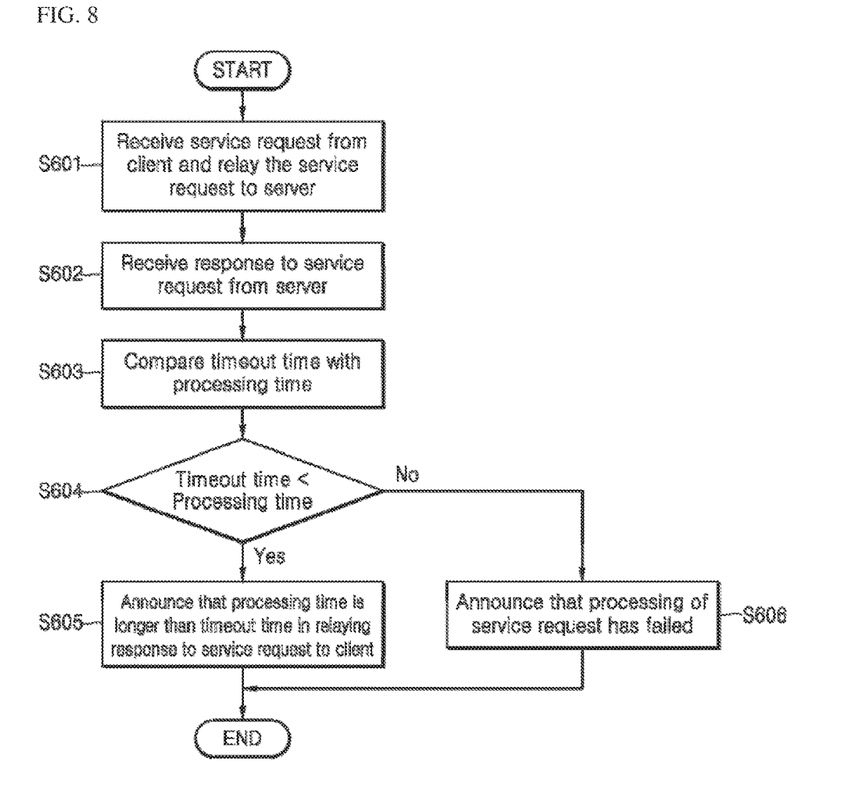
FIG. 8 illustrates a procedure of communication of a communication apparatus in an electric power system according to an embodiment of the present invention.

FIG. 8 illustrates a procedure of communication of a communication apparatus in an electric power system according to an embodiment of the present invention.

The communication apparatus 200 receives a service request from the client 240 and relays the same to the server 250 (S601).

In response to the service request, the communication apparatus 200 receives a response to the service request from the server 250 (S602).

The communication apparatus 200 compares the timeout time for which the client 240 waits for the response to the service request with a processing time for which the server 250 processes the service request (S603).

Upon determining that the processing time is longer than the timeout time (S604—Yes), the communication apparatus 200 delivers the response to the service request to the client 240, announcing that the processing time is longer than the timeout time (S605).

According to an embodiment, the communication apparatus 200 may transmit, to the client 240, a message indicating that the processing time is longer than the timeout time.

According to an embodiment, the communication apparatus 200 may generate a log file in which information indicating that the processing time is longer than the timeout time is recorded.

On the other end, upon determining that the processing time is shorter than or equal to the timeout time (S604-No), the communication apparatus 200 may relay the response to the service request to the client 240, announcing that processing of the service request has failed (S606).

Thereby, the client 240 may distinguish between a case where the response to the service request fails to be received because the processing time is longer than the timeout time and a case where processing of the service request fails because there is a problem with a router or application. Further the client 240 may take a proper action according to each situation.

According to embodiments of the present invention, when a data processing time of the replier is longer than a timeout time set by the requester in the 3 Tier architecture of Requester-Broker-Replier, the broker compares the times and announces, to the user, a reason for failing to send a response to the request to the requester through a log file or message. Thereby, the time taken to analyze the cause may be reduced.

Exemplary embodiments of the present invention have been described in detail with reference to the accompanying drawings. However, the present invention is not limited to the exemplary embodiments, and modifications and variations can be made thereto without departing from the technical idea of the present invention. For example, specific constituents disclosed in the embodiments of the present invention may be changed. It should be understood that such changes and related applications are within the scope of the present invention defined by the accompanying claims.

What is claimed is:

1. An electric power control system comprising:
   a communication apparatus;
   a server operative to process a service request message received from the communication apparatus and transmit a response message to the service request to the communication apparatus; and
   a client operative to transmit the service request message to the communication apparatus and receive the response message to the service request processed by the server via the communication apparatus,
   wherein the communication apparatus recognizes a timeout time from the server request message and a processing time from the response message, and comprises a communication unit, a comparison/determination unit, and a controller,
   wherein the communication unit is operative to communicate with the client and server included in the electric power system to relay the service request message received from the client to the server and relay the response message to the service request message received from the server to the client,
   wherein the service request message, received by the communication apparatus from the client, contains a frame field including the timeout time, representing the time for which the client waits for a response to the service request message, and
   the response message to the service request message, received by the communication apparatus from the server, contains a frame field including the processing time being information about time taken for the server to process the service request message of the client,
   the comparison/determination unit is operative to compare the timeout time with the processing time, and
   the controller is operative to
   control the communication unit and the comparison/determination unit,
   add a fail reason frame field indicating a reason for failure of a service response to the response message when the processing time is longer than the timeout time, and
   control the communication unit to transmit, to the client, a message containing the fail reason frame field.

2. The electric power system according claim 1, wherein the controller generates a log file for recording content indicating that the processing time is longer than the timeout time.

3. The electric power system according claim 1, wherein the comparison/determination unit determines a delay time of the response to the service request message from the timeout time by comparing the timeout time with the processing time,
   wherein the controller controls the communication unit to transmit, to the client, a message for instructing adjustment of the timeout time based on the delay time.

* * * * *